United States Patent [19]

Sanda et al.

[11] Patent Number: 5,238,561
[45] Date of Patent: Aug. 24, 1993

[54] HOLLOW FIBER MASS TRANSFER APPARATUS

[75] Inventors: Tetsuya Sanda; Tsuyoshi Watanabe, both of Fujinomiya, Japan

[73] Assignee: Terumo Kabushiki Kaisha, Tokyo, Japan

[21] Appl. No.: 887,609

[22] Filed: May 22, 1992

Related U.S. Application Data

[63] Continuation of Ser. No. 766,432, Sep. 25, 1991, abandoned.

[30] Foreign Application Priority Data

Sep. 27, 1990 [JP] Japan .................................. 2-255056
Apr. 2, 1991 [JP] Japan .................................. 3-94858

[51] Int. Cl.$^5$ ............................................. B01D 63/02
[52] U.S. Cl. ............................ 210/321.8; 210/321.89; 210/500.23
[58] Field of Search ........... 210/321.6, 321.72, 321.78, 210/321.79, 321.8, 321.81, 321.87, 321.88, 321.89, 321.9, 500.23

[56] References Cited

U.S. PATENT DOCUMENTS

3,882,024  5/1975  Holmes .
4,869,822  9/1989  Kamei et al. .................... 210/321.88

FOREIGN PATENT DOCUMENTS

0001736   5/1979   European Pat. Off. .
0181470   5/1986   European Pat. Off. .
0222032   5/1987   European Pat. Off. .
3144552A1 5/1983   Fed. Rep. of Germany .
3144553A1 5/1983   Fed. Rep. of Germany .
3711695   10/1988  Fed. Rep. of Germany .
63-52522  10/1988  Japan .

*Primary Examiner*—Frank Sever
*Attorney, Agent, or Firm*—Frishauf, Holtz, Goodman & Woodward

[57] ABSTRACT

A hollow fiber mass transfer apparatus has a casing having inlet and outlet ports for dialyzing liquid. A bundle of hollow fibers is housed in the casing. Two partition members hold the bundle without closing the openings of the hollow fibers. Two funnel-like headers surround the openings of the hollow fibers. Blood, for example, passes from the frusto-conical portion of the header through the fibers and out from the inverted frusto-conical portion of the header. In the header 16, the inner diameter D of the fitting portion and the height H between the fitting portion and frusto-conical portion has a relationship: $0.8 \leq H/D \leq 1.2$.

5 Claims, 6 Drawing Sheets

HOLLOW FIBER MASS TRANSFER APPARATUS

This application is a continuation of application Ser. No. 07/766,432, filed Sep. 25, 1991, now ABN.

BACKGROUND OF THE INVENTION

1. Field of the Invention

This invention relates to a hollow fiber mass transfer apparatus for use in, for example, dialysis, ultrafiltration, membrane filtration, reverse osmosis, gas-gas isolation, gas-liquid isolation, liquid-liquid isolation, solid-liquid isolation.

2. Description of the Related Art

A hollow fiber mass transfer apparatus is disclosed in, for example, Published Examined Japanese Patent Application No. 63-52522 and has a casing in which a bundle of hollow fibers is arranged. The bundle of the hollow fibers has its both opposite ends respectively held by partition members made of synthetic high polymer material and secured to both opposite ends of the casing. The openings of the hollow fibers open at the outer surfaces of the partition members. Further, funnel-like headers are mounted on the opposite ends of the casing, for surrounding all the openings of the hollow fibers. That is, each header defines a space with each partition member therebetween. The headers each have a large-diameter portion connected to a corresponding end of the casing, and a small-diameter portion to be connected to a first mass (e.g. blood) circulation circuit. The casing has connecting portions to be connected to a second mass (e.g. dialyzing fluid) circulation circuit communicating with a space defined between the partition members, around the hollow fibers.

In the prior art apparatus, however, there may occur a deflected flow and stay of the first mass in the header, thereby causing precipitations or deposits in the header. In particular, if the first mass is blood, a thrombus may grow in a portion of the header in which the stay of the first mass occurs.

A deflected flow and stay of the first mass as described above is conspicuously found in a header in which the first mass circulation path is deflected from the axis of the header.

SUMMARY OF THE INVENTION

It is therefore an object of the invention to provide a hollow fiber mass transfer apparatus which is free from such a deflected flow or stay of the first mass and hence exhibits a good mass treatment performance, without accompanying the formation of precipitates or deposits.

According to the present invention, there is provided a hollow fiber mass transfer apparatus comprising: a casing having first and second end portions; a bundle of hollow fibers housed in the casing; first and second partition members holding the hollow fiber bundle at the first and second end portions of the casing, respectively, such that openings of the hollow fibers open at each of the outer end surface of the members; a first funnel-like header fitted over the first end of the casing to surround all the openings of the hollow fibers at the first end of the casing, and comprising a first mass inlet port having a frusto-conical inner surface and a fitting portion of a larger diameter, the lower end of which abuts against the first partition member; a second funnel-like header fitted over the first end of the casing to surround all the openings of the hollow fibers at the second end of the casing, and comprising a first mass outlet port of a smaller diameter, and a fitting portion of a larger diameter, the lower end of which abuts against the second partition member; and inlet and outlet means for a second mass, provided on the casing in communication with a space around the hollow fibers; wherein the condition $0.8 \leq H/D \leq 1.2$ is satisfied, where D represents the inner diameter of the fitting portion of the first header, and H represents the height between the lower end of the fitting portion and the tip end of the first mass inlet port of the first header.

In a preferred embodiment, the first header has an inner surface comprising a substantially tapered portion extending from the inner surface of the fitting portion, a radiused portion extending from the tapered portion and bent outwardly with a predetermined curvature to the frusto-conical inner surface of the first mass inlet port. In this case, the tapered portion preferably has a gradient $\theta$ falling within a range of 1° to 7°, and the vertical angle of the frusto-conical surface is preferably 18° to 22°.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

The present invention will be described in more detail with reference to the accompanying drawings.

Figure 1:
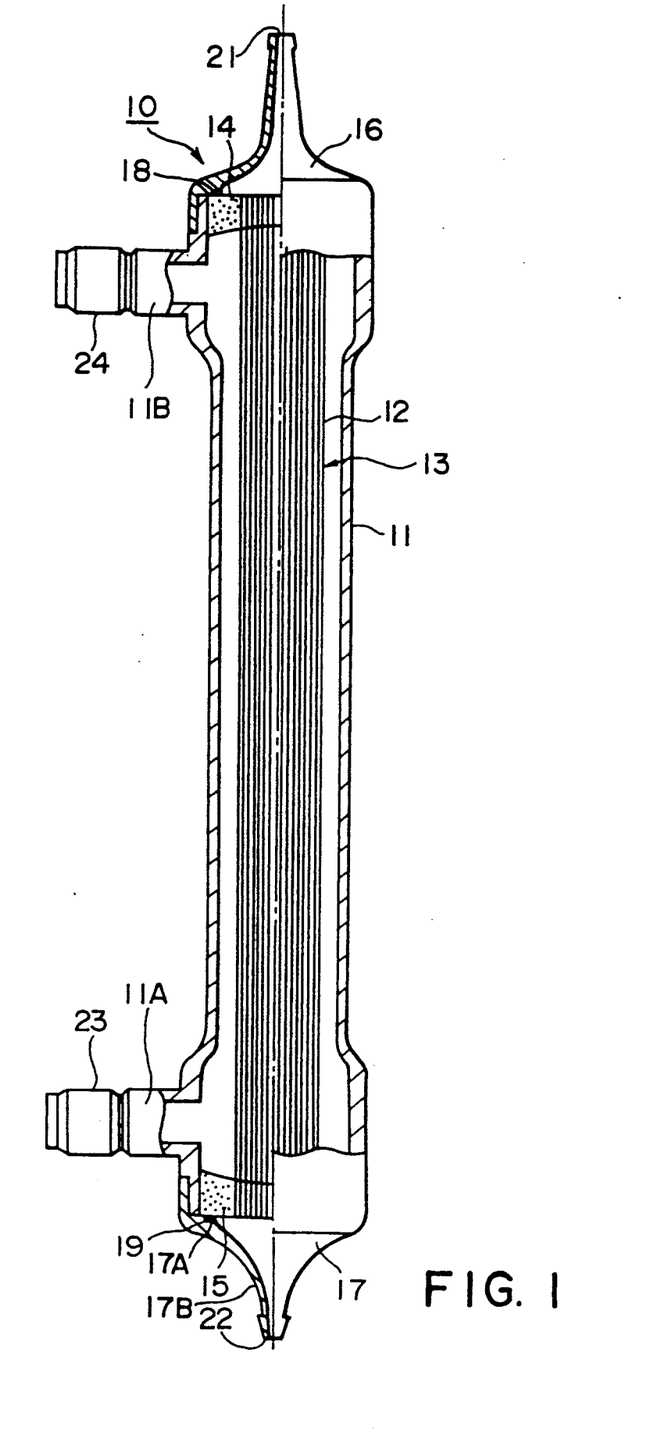
FIG. 1 is a sectional view of an artificial kidney according to the invention.

FIG. 1 shows an artificial kidney 10 to which the present invention is applied. The kidney 10 comprises a generally hollow cylindrical casing 11, in which a bundle 13 of hollow fibers 12 are housed. The bundle 13 is held at its both end portions by partition members 14 and 15 set at the both end portions of the casing 11. The partitions 14 and 15 are made according to a conventional method by pouring a potting resin into both opposite end portions of the casing 11 and hardening it.

The partition members 14 and 15 hold the fiber bundle 13 such that opposite open ends of each hollow fiber open to the external end surfaces of the members 14 and 15.

Funnel-like headers 16 and 17 are fitted over the both opposite ends of the casing 11 by bonding or screwing, through sealing members 18 and 19 such as O-rings set in the recessed portions of the headers, respectively. The headers 16 and 17 have fitting portions 16A and 17A, respectively, the ends of which abut against the partition members 14 and 15, respectively. The headers 16 and 17 surround all the open ends of the hollow fibers 12 at the opposite ends of the casing 11, respectively.

Figure 2:
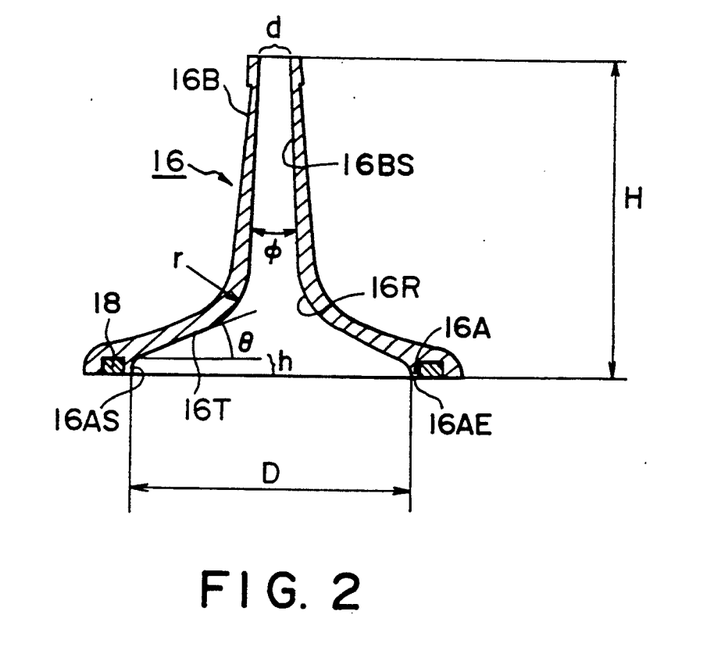
FIG. 2 is a sectional view, showing the shape of a header according to the invention

More specifically, as shown in FIG. 2, the header 16 has a fitting portion 16A of a large diameter having an inner surface 16AS, with the lower end 16AE of the portion 16A abutting against the partition member 14 as shown in FIG. 1, and a frusto conical portion 16B of a smaller diameter. The height h of the fitting portion 16A is, usually, 2 to 5 mm. The portion 16B constitutes a blood inlet port 21 (see FIG. 1), to which a blood circulation circuit is to be connected, and the blood from the blood circulation circuit is introduced therefrom to flow through the interior of each hollow fiber 12. The inner diameter d of the portion 16B at the tip end thereof is, usually 3 to 5 mm.

Moreover, as seen from FIG. 2, the inner surface of the header 16 is constituted by the inner surface 16AS of the portion 16A, a tapered surface 16T continuous with the inner surface 16AS, and the frusto-conical inner surface 16BS of the portion 16B, with an intermediate radiused surface 16R having a radius of curvature r which connects the tapered surface 16T and the frusto-conical surface 16BS.

In accordance with the present invention, the ratio H/D is set at 0.8 to 1.2, where H denotes the distance or height of the header 16 from the tip end of the portion 16B to the lower end 16AE of the portion 16A, and D denotes the inner diameter of the portion 16A. The inner diameter D is, usually, 25 to 60 mm.

In a more preferred embodiment, the gradient $\theta$ of the tapered surface 16T is set at 1° to 7°, more preferably 2.5° to 5° and most preferably about 3° and the vertical angle $\phi$ of the frusto-conical surface 16BS is preferably 18° to 22°.

Turning to FIG. 1, the header 17 also has a similar fitting portion 17A of a larger diameter, and a frusto-conical portion 17B of a smaller diameter. The portion 17B constitutes a blood outlet port 22 for allowing blood which has passed through the hollow fibers 12 to return to the blood circulating circuit. It is not necessary to subject the structure of the header 17 to the conditions set forth above with respect to to the header 16, though the header 17 may have the same structure as the header 16.

Further, a dialyzing fluid inlet port 23 is provided at that connecting portion 11A of the casing 11 which is located near the partition member 15, and communicates with the space surrounding the hollow fibers 12 within the casing 11. A dialyzing fluid outlet port 24 is provided at that connecting portion 11B of the casing 11 which is located near the partition member 14, and communicates with the space surrounding the hollow fibers12.

That is, in the artificial kidney 10, blood flows from the blood inlet port 21 to the blood outlet port 22, and the dialyzing fluid flows from the dialyzing fluid inlet port 23 to the outlet 24. In this state, mass transfer occurs through the hollow fibers 12 each consisting of a semipermeable membrane.

The casing 11 and headers 16 and 17 are made of, e.g., hard synthetic resin such as polypropylene or polycarbonate.

The partition members 14 and 15 are made of, e.g., synthetic resin such as polyurethane or silicone.

The hollow fiber 12 is made of, e.g., regenerated cellulose in the case of an artificial kidney, while it is made of, e.g., polypropylene in the case of an artificial lung. The fiber, i.e., the semipermeable membrane has an inner diameter of approx. 200 $\mu$m, and a thickness of approx. 9-15 $\mu$m. The bundle 13 consists of, for example, 500-15,000 hollow fibers 12.

EXPERIMENT 1

The present inventor has conducted experiments to obtain an artificial kidney exhibiting a good blood treatment performance by preventing deflected flow or stay of the blood in the header 16, thereby avoiding growth of a thrombus. The experiments were carried out by using an artificial kidney of a shape as shown in FIG. 1. Specifically, as shown in FIG. 2, the inner surface of the header 16 consists of a tapered portion 16T extending from the inner surface 16AS of the largediameter fitting portion 16A, an intermediate portion extending from the tapered portion and bent outwardly with a predetermined curvature, and a cylindrical portion 16S extending substantially straight from the intermediate portion. The inner diameter D of the large-diameter portion 16A and the distance H between the large-diameter portion 16A and small-diameter portion 16B were varied in the experiments.

Figure 3:
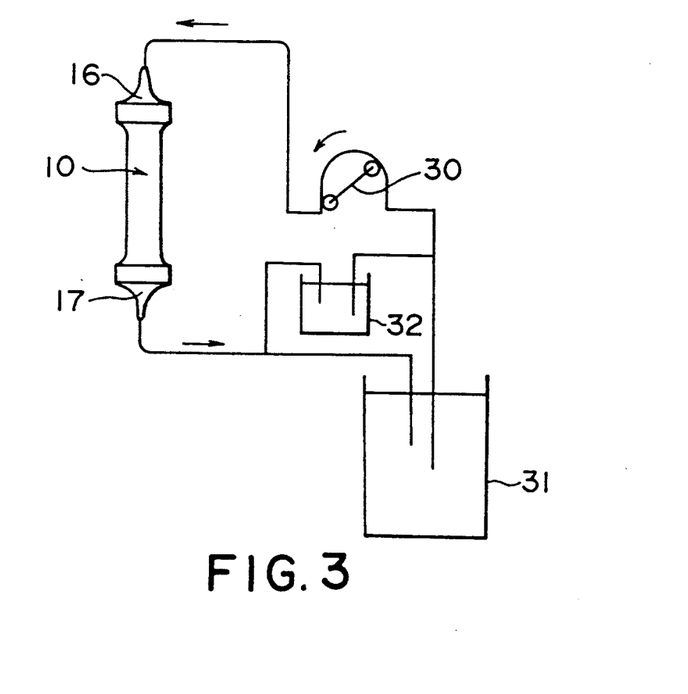
FIG. 3 is a circuit diagram, showing the experiment carried out in order to determine the shape of the header of FIG. 2.

A blood-circulation circuit was connected to the headers 16 and 17 of the artificial kidney 10, as is shown in FIG. 3. In the figure, reference numeral 30 designates a pump, reference numeral 31 a cattle blood container, and reference numeral 32 a physiological saline solution container.

Circulation of cattle blood was performed using seven types of headers as shown in Table 1, and under the conditions shown in Table 2. The degree of growth of a thrombus in the header 16 was measured.

TABLE 1

| | HEADER SIZE | | |
|---|---|---|---|
| No. | HEIGHT H/ INNER DIAMETER D | HEIGHT | INNER DIAMETER |
| 1 | 0.7 (0.701) | 23.5 mm | 33.5 mm |
| 2 | 0.8 (0.806) | 27.0 | 33.5 |
| 3 | 0.9 (0.896) | 30.0 | 33.5 |
| 4 | 1.0 (1.045) | 35.0 | 33.5 |
| 5 | 1.1 (1.104) | 37.0 | 33.5 |
| 6 | 1.2 (1.194) | 40.4 | 33.5 |

TABLE 1-continued

| | HEADER SIZE | | |
|---|---|---|---|
| No. | HEIGHT H/ INNER DIAMETER D | HEIGHT | INNER DIAMETER |
| 7 | 1.3 (1.314) | 44.0 | 33.5 |

TABLE 2

| CATTLE BLOOD CIRCULATION TEST CONDITIONS | |
|---|---|
| CATTLE BLOOD HEMATORCRIT VALUE | 29.2% |
| ADDED AMOUNT OF HEPARIN | 3,000 IU/l |
| TEMPERATURE | 36 ± 2° C. |
| FLOW RATE | 200 ± 4 ml/min |

First, cattle blood was circulated for two hours through the blood-circulation circuit and a sample of the artificial kidney 10, using a header No. 1 shown in Table 1, which had been filled with a physiological saline solution. Then, the cattle blood was returned to the container by means of the saline solution.

This was also done with headers No. 2 - No. 7 shown in Table 1, respectively. As a result, it was found that a white thrombus grew in the headers No. 1 and No. 7 (see FIGS. 4 and 10).

In light of the experiences so far, it is considered that a thrombus will grow after approx. two-hour circulation of cattle blood if there is a blood stay portion in the header 16, and that a further thrombus will not grow even if the blood circulation is continued over five hours, since the activity of the blood is lost in this case.

Figure 4A:
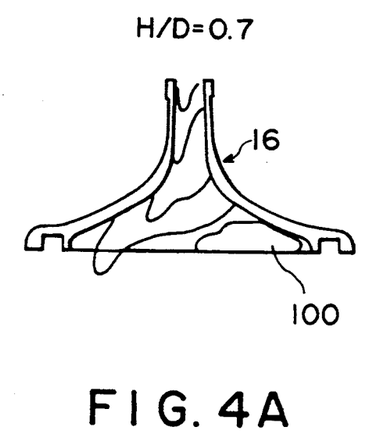
FIGS. 4A and 4B are views for explaining how the blood flows through the header when H/D is equal to 0.7.
Figure 4B:
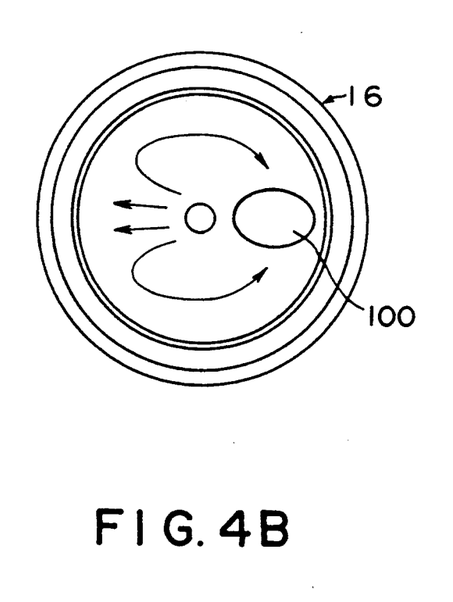
Figure 5A:
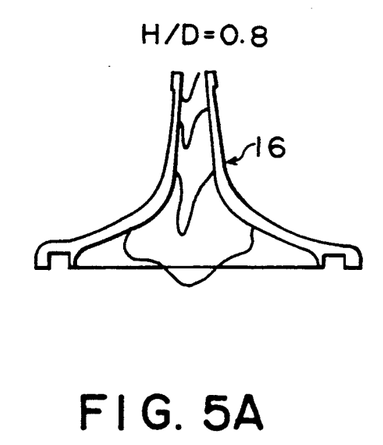
FIGS. 5A and 5B are views for explaining how the blood flows through the header when H/D is equal to 0.8.
Figure 5B:
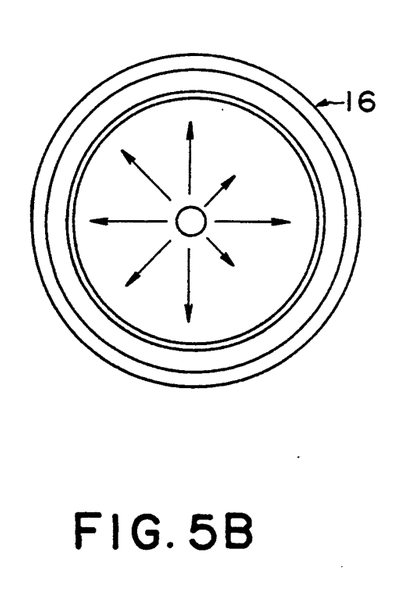
Figure 6A:
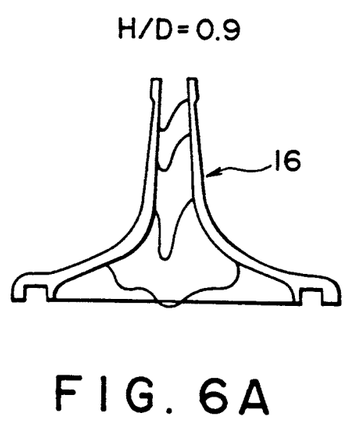
FIGS. 6A and 6B are views for explaining how the blood flows through the header when H/D is equal to 0.9.
Figure 6B:
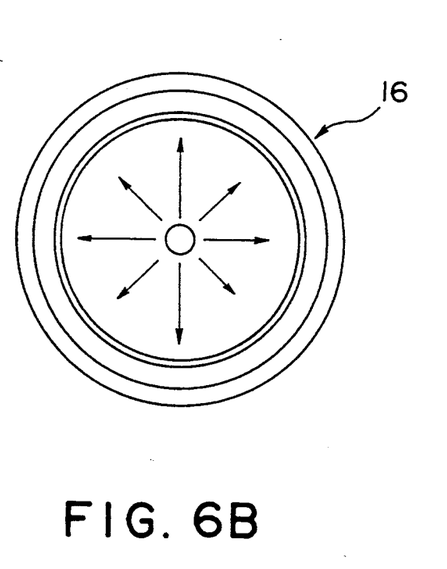
Figure 7A:
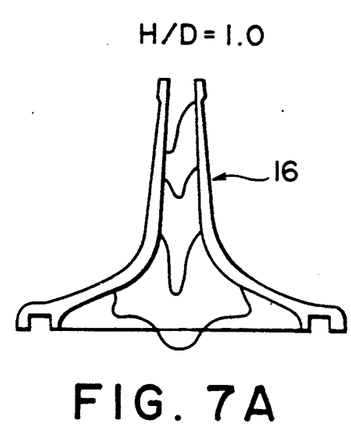
FIGS. 7A and 7B are views for explaining how the blood flows through the header when H/D is equal to 1.0.
Figure 7B:
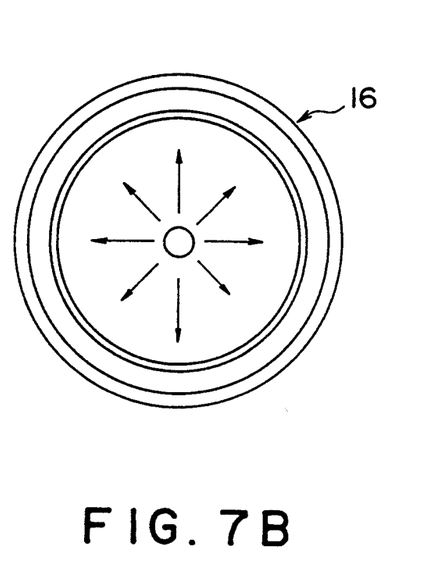
Figure 8A:
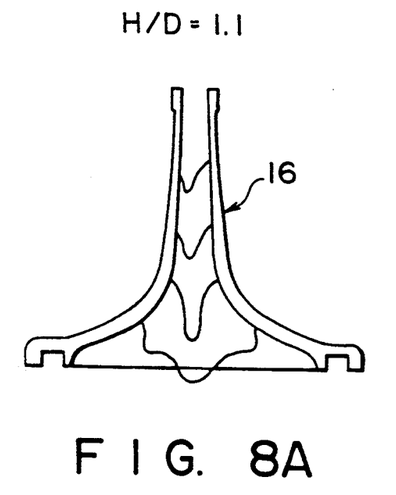
FIGS. 8A and 8B are views for explaining how the blood flows through the header when H/D is equal to 1.1.
Figure 8B:
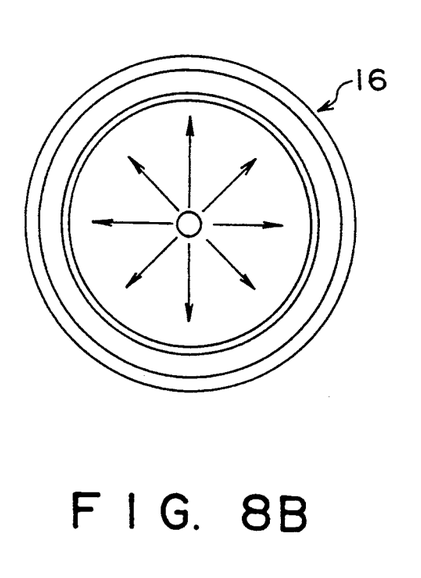
Figure 9A:
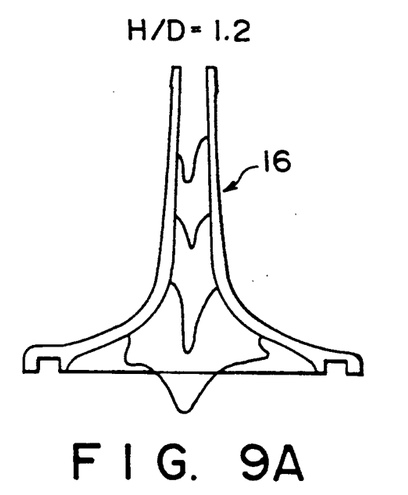
FIGS. 9A and 9B are views for explaining how the blood flows through the header when H/D is equal to 1.2.
Figure 9B:
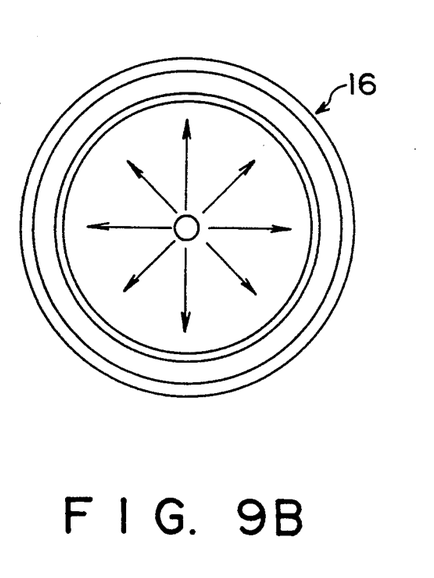
Figure 10A:
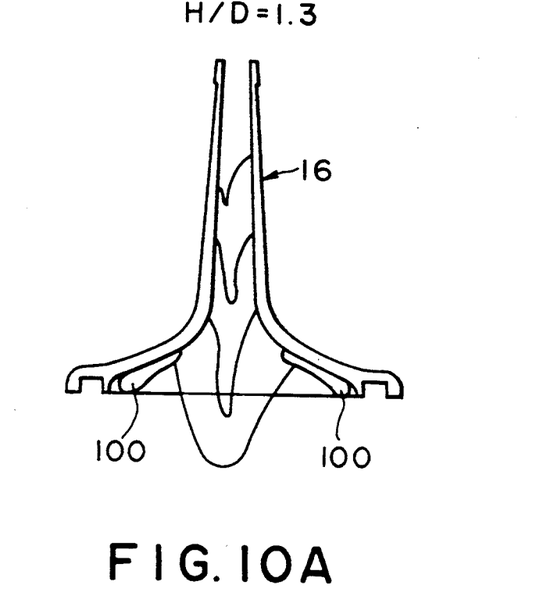
FIGS. 10A and 10B are views for explaining how the blood flows through the header when H/D is equal to 1.3.
Figure 10B:
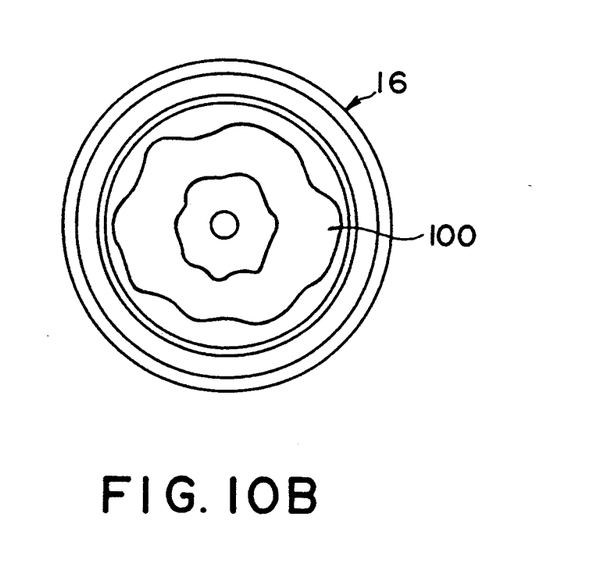

The inventor obtained the following knowledge i)–iii) from the above experiments:

i) As is shown in FIG. 4 directed to the case of H/D=0.7, if H/D<0.8, that route along the header height (particularly along the substantially straight portion 16S) which controls blood, introduced into the header, to flow in the axial direction thereof is relatively short. Thus, the blood cannot make a straight flow along the axis in the header 16, i.e., the center of the flow will be deflected from the axis, which may cause a blood stay portion 100 along the inner periphery of the large-diameter portion 16A, thereby causing a thrombus.

ii) As is shown in FIG. 10 directed to the case of H/D=1.3, if H/D>1.2, that route along the header height (particularly along the substantially straight portion 16S) which controls blood, introduced into the header, to flow in the axial direction thereof is relatively long. Thus, the blood will make a long straight flow along the axis in the header 16, resulting in that the flow of the blood at the center of the header is larger than that along the periphery thereof. Thus, a blood stay portion 100 may extend along the overall inner periphery of the large diameter portion 16A, causing a thrombus.

iii) As is shown in FIGS. 5-9 directed to the cases of H/D=0.8, 0.9, 1.0, 1.1, and 1.2, respectively, if 0.8<H/D<1.2, that route along the header height (particularly along the substantially straight portion 16S) which controls blood, introduced into the header, to flow in the axial direction thereof has an appropriate length (preferably, 0.9≦H/D≦1.1). Thus, the blood will form an appropriate straight flow along the axis in the header 16, which does not cause deflected flow of the blood or stay thereof, being free from a blood stay portion 100, and hence a thrombus. Consequently, the header constructed as above provides a good blood treatment performance.

Further, the present inventor conducted similar experiments, by using the headers shown in Table 3 below. The cattle blood was flown under the condition specified in Table 4 below with the results shown in Table 5. The blood circulation time limit is the point at which the initial value of PBi (the pressure at the blood inlet side) is lowered by 50 mmHg.

TABLE 3

| | φ | θ | r | H/D |
|---|---|---|---|---|
| No. 21 | 18 | 8 | 20 | 1.0 |
| No. 22 | 18 | 13 | 12 | 1.0 |
| No. 23 | 20 | 4 | 7 | 1.0 |
| No. 24 | 10 | 14 | 4 | 1.0 |

TABLE 4

| CATTLE BLOOD HEMATORCRIT VALUE | 30.2% |
|---|---|
| ADDED AMOUNT OF HEPARIN | 3,000 U/l |
| TEMPERATURE | 37 ± 2° C. |
| FLOW RATE | 200 ± 4 ml/min |

TABLE 5

| | Blood circulation Time (min.) | State of thrombus |
|---|---|---|
| No. 21 | 246 | Δ |
| No. 22 | 204 | Δ |
| No. 23 | 300 | ○ |
| No. 24 | 186 | Δ |

○ ... Adhesion of Small amount of white thrombus
Δ ... Growth of white thrombus
× ... Growth of white thrombus on the entire open ends of the hollow fibers From the second experiments, the following knowledges iv)-vi) were obtained.

iv) With φ of 18 to 22 degrees, the blood can flow along the frusto-conical inner surface of the header 16 with uniform spreading toward the large opening into the hollow fibers.

v) With θ of 1 to 7 degrees, the lineal speed of the blood at the peripheral portion can be increased, with the result that the blood can flow into the hollow fibers without lowering flow rate of the blood at the peripheral portion.

vi) When the frusto-conical surface and the tapered portion 16T are extrapolated by the radiused portion 16R at the maximum radius of curvature r, the blood can flow more smoothly within the header 16 without deflected flow or stay of flow of the blood.

As described above, the hollow fiber mass transfer apparatus of the invention can provide a good mass treatment performance by preventing deflected flow or stay of first mass introduced into the header, thereby preventing occurrence of any deposits.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A hollow fiber mass transfer apparatus comprising:
   a casing having first and second end portions;

a bundle of hollow fibers housed in the casing;

first and second partition member for holding the hollow fiber bundle at the first and second end portions of the casing, respectively, such that an opening, at each end of each of the hollow fibers is respectively open at an outer end surface of each of the partition members;

a first funnel-shaped header fitted over the first end portion of the casing to surround all the openings of the hollow fibers at the first end portion of the casing;

said first funnel-shaped header comprising:
 a first mass inlet port having a first diameter and a frustoconically shaped inner surface;
 a first fitting portion having a larger diameter than the first diameter of the first mass inlet port; and
 a lower end portion of the first funnel-shaped header abutting against the first partition member;

a second funnel-shaped header fitted over the second end portion of the casing to surround all the openings of the hollow fibers at the second end portion of the casing;

said second funnel-shaped header comprising:
 a first mass outlet port having a second diameter;
 a second fitting portion having a larger diameter than the second diameter of the first mass outlet port; and
 a lower end portion of the second funnel-shaped header abutting against the second partition member;

inlet and outlet means for a second mass, provided on the casing in fluid communication with a space around the hollow fibers; and wherein:

a condition: $0.8 \leq H/D \leq 1.2$ is satisfied, where D represents an inner diameter of the first fitting portion of the first funnel-shaped header, and H represents a height between a lower end portion of the first fitting portion and a tip end portion of the first mass inlet port of the first funnel-shaped header.

2. The apparatus according to claim 1, wherein said first funnel-shaped header has an inner surface comprising:
 a substantially tapered portion extending from an inner surface of the first fitting portion; and
 a radiused portion, extending from the substantially tapered portion, said radiused portion being bent to extend n an outward direction with a predetermined curvature so as to join with the frustoconically shaped inner surface of the first mass inlet port.

3. The apparatus according to claim 2, wherein said tapered portion has a gradient $\theta$ of 1° to 7°, and a vertical angle of the frustoconical surface is 18° to 22°.

4. A hollow fiber mass transfer apparatus comprising:
a casing having first and second end portions;

a bundle of hollow fibers, each hollow fiber respectively having first and second openings at first and second end portion s thereof, said bundle of hollow fibers being housed in said casing;

first and second partition members for holding said hollow fiber bundle at said first and second portions of said casing, respectively, such that sad first and second openings of each of said hollow fibers is respectively open at each of an outer end surface of each of said partition members;

a first funnel-shaped header fitted over said first end portion of said casing to surround all said first openings of said hollow fibers at said first end portion of said casing;

said first funnel-shaped header comprising:
 a first mass inlet port having a frustoconically shaped inner surface; a first fitting portion having a first diameter, a lower end portion of said first fitting portion abutting against said first partition member; and
 said frustoconically-shaped inner surface including:
  a substantially tapered portion, extending from an inner surface of the first fitting portion; and
  a radiused portion, extending from said substantially tapered portion, said radiused portion being bent to extend in an outward direction with a predetermined curvature so as to join with said frustoconically shaped inner surface of sad first mass inlet port;

a second funnel-shaped header, fitted over said second end portion of said casing to surround all said second openings of said hollow fibers at said second end portion of said casing, said second funnel-shaped header comprising:
 a first mass outlet port having a second diameter smaller than a second fitting portion having a lower end portion that abuts against said second partition member; and
 second mass inlet and outlet means provided on said casing for a second mass, said second mass inlet and outlet means being in fluid communication with a space around said hollow fibers; and wherein:

a condition: $0.8 \leq H/D \leq 1.2$ is satisfied, where D represents an inner diameter of said first fitting portion of said first funnel-shaped header, and H represents a height as measured from a lower end portion of said first fitting portion to a tip end portion of said first mass inlet port of sad first funnel-shaped header; and said substantially tapered portion of said frustoconically shaped inner surface of said mass inlet port having a gradient of 1 to 7 degrees.

5. The apparatus according to claim 4, wherein a vertical angle of the frustoconically shaped surface is 18 to 22 degrees.

* * * * *